April 30, 1940. W. R. HULTBERG 2,199,260
DRAWER SUSPENSION
Filed Dec. 2, 1937

Inventor
Walter R. Hultberg
By Richmond S. Hayes
Attorney

Patented Apr. 30, 1940

2,199,260

UNITED STATES PATENT OFFICE 2,199,260

DRAWER SUSPENSION

Walter R. Hultberg, Corry, Pa., assignor to Corry-Jamestown Manufacturing Corporation, Corry, Pa., a corporation of New York Application December 2, 1937, Serial No. 177,729

6 Claims. (Cl. 45—77)

This invention relates to an improvement in cases or cabinets and more particularly to suspensions for slidably mounting the drawers thereof.

In one form the invention is directed to the provision of a suspension for drawers and the like in which the slides of the suspension are so correlated as to give strength and rigidity to each other and at the same time be permitted a certain amount of relative adjustment for the purpose of providing free and unhampered movement of a drawer by eliminating the tendency of the slides of the drawer to bind.

Prior to this invention it has been the practice to mount sliding drawers in a case or cabinet through the use of either of two types of suspensions, namely, a suspension in which the slides are individually movable, or a carriage or cradle type suspension wherein the slides are rigidly connected by strap members extending beneath the drawer. In the suspension having individually movable slides it has been found that as the drawer is moved outwardly and the slides are under a heavy strain and load, there is a tendency to twist and become slightly warped or bent. Consequently, when the drawer is closed the slides tend to rub and bind against the drawer, cabinet, or other element of the suspension. Furthermore, suspensions having independent slides must be carefully inspected, tested, and installed to assure even limited successful operation, and this involves a considerable labor cost. The cradle type of suspension is rigid, that is, the slides thereof are secured by one or more straps extending beneath the drawer. Although this type of suspension is simpler and less costly to install, the fact that the slides thereof are rigid prevents necessary lateral adjustment thereof as a drawer is moved from one position to another, and consequently, if a suspension of this type is not accurately assembled and installed, binding of the slide with the drawer and the cabinet is likely to occur from time to time and thus prevent free and easy movement of the drawer.

The present invention includes advantages of the above mentioned types of suspensions without their disadvantages by providing a pair of slides for a drawer which are connected at the forward and possibly the rearward ends by transverse telescoping members. These members give considerable rigidity to the slides, making them more or less of a unit, and this thereby facilitates installation. At the same time, the slides are permitted a certain amount of lateral movement with respect to each other so that they may follow in their proper tracks in the cabinet and not cause the drawer to bind thereagainst.

One of the objects of the invention lies in the provision of a suspension which facilitates free and easy movement of a drawer supported thereby.

Another object of the invention lies in the provision of a suspension having correlated slides which operate as a unit for the purpose of preventing misalignment thereof under substantially all conditions of use.

Another object of the invention lies in the provision of a suspension of the cradle type in which the slides have lateral adjustability.

Other and further objects of the invention will be more fully understood from a consideration of the following specification taken in conjunction with the accompanying drawing and in which Fig. 1 is a fragmentary side elevation of a case or cabinet type drawer supported in partially extended position on a suspension involving one form of the invention;

Figure 1:
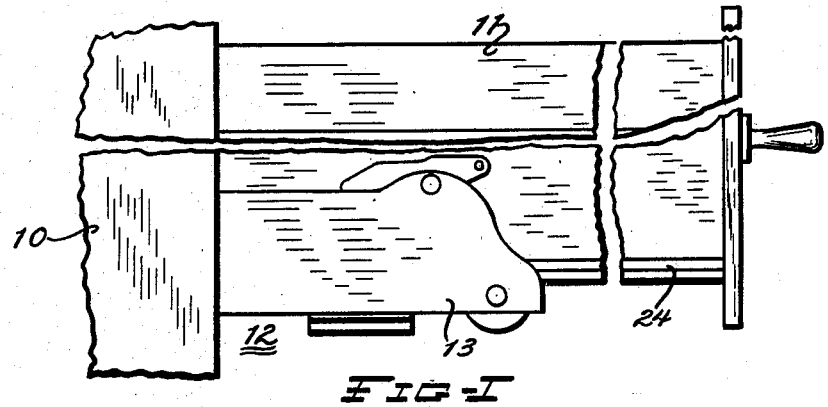
Figure 2:
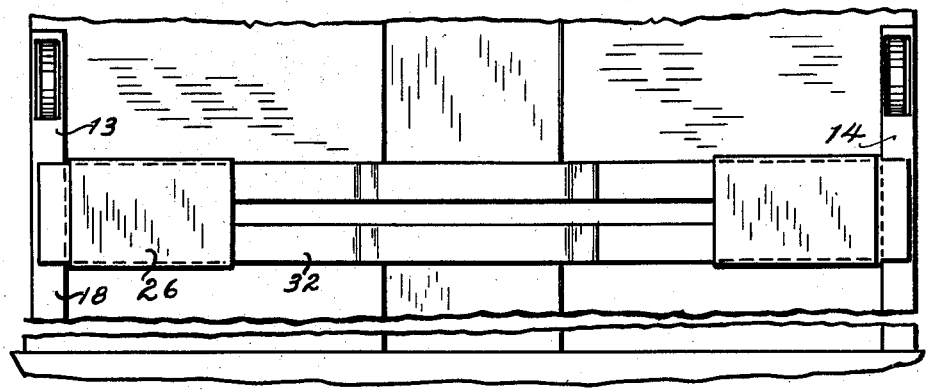
Fig. 2 is a bottom plan view of a part of the suspension disclosing the means for connecting the slides thereof.

Reference is now had to the drawing wherein the numeral 10 is employed to designate a conventional case or cabinet adapted to mount a drawer 11. The drawer 11 is mounted on a suspension 12 which is movable with respect to the cabinet 10 for the purpose of facilitating opening and closing of the drawer. Inasmuch as the case and drawer structure form no part of the invention, further description thereof is deemed unnecessary.

The suspension 12 includes a pair of spaced apart slides 13 and 14 having identical reversed parts. Each slide comprises a vertical wall 16 which is terminated by a top horizontal flange 17. A bottom flange 18 terminates in a return bent flange 19. Mounted in the space 21 between the wall 16 and flange 19 are suitable rollers 22. As shown in the drawing, certain of the rollers may project downwardly through a suitable slot in the flange 18 for the purpose of contacting a track 23 secured to the inner wall of the cabinet 10. A conventional angle plate or rail 24 is joined to the side wall of the drawer 11 and rests upon the upper surface of rollers 22 and any other rollers that may be considered necessary. The slides 13 and 14 are conventional and may be used as independent suspensions for the drawer. However, inasmuch as independently movable slides or drawer suspensions fail to always move simultaneously and to the same extent during manipulation of a drawer, there is a tendency for one or the other of the slides to become misaligned with the track 23 or rail 24. Furthermore, when the drawer is fully extended, the weight of the contents thereof or the weight of a person examining the contents tends to twist the partially unsupported slides, causing them to become permanently warped or bent and thus impairing their relatively free movement.

Figures 3, 4:
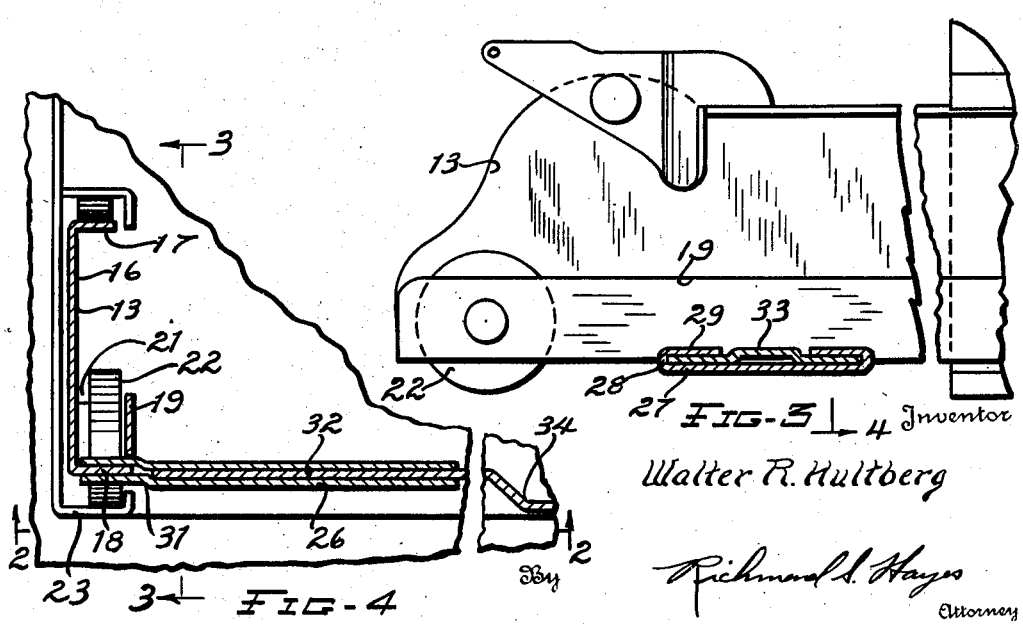
Fig. 3 is a vertical longitudinal sectional view taken substantially on the line 3—3 of Figure 4.
Fig. 4 is a vertical transverse sectional view taken substantially on the line 4—4 of Figure 3.

It has been found advisable to provide means for connecting the slides 13 and 14 so that during movement of the drawer they may move inwardly and outwardly as one element. At the same time it is necessary that the slides have lateral adjustability for the purpose of overcoming any possible structural inaccuracies and the frequent tendency of the user of a file to attempt to manipulate the drawer from one side or the other rather than directly from the front. To secure the slides and at the same time provide limited lateral adjustability is one of the purposes of the present invention and is accomplished in the following manner. A channel-like member 26 having a base wall 27, side flanges 28 and return bent flanges 29 is secured, along an offset portion 31 thereof, to the flange 18 of the slide 13 in any suitable manner as by welding. Increased rigidity of the member 26 with respect to the slide 18 may be had by cutting away side flanges 28 of the offset portion 31, slotting the flange 19 to receive flanges 29, and interfitting the elements of the member 26 and slide 13. The member 26 extends substantially at right angles to the slide and may be mounted forwardly thereof adjacent the foremost roller 22. A corresponding member 26 is secured in the same manner to slide 14. These members are adapted to be connected by a bar 32 which in one form is provided with a central longitudinally extending rib 33 that lies between the adjacent edges of flanges 29 of the member 26. The longitudinal edges of the bar 32 lie within pockets formed by the flanges 27, 28, and 29 of the member 26. The bar 32 may be provided with a centrally depressed area 34 which serves to further rigidify the bar and also provides clearance with respect to any stops or other necessary projections on the under surface of the drawer. It will be noted (see Figure 4) that the offset portion 31 serves as a stop to limit telescoping of the bar 32 with the member 26. It will also be noted that the slides 13 and 14 may move laterally with respect to each other and the bar 32, but due to the proportions of the bar and the method of mounting it on the members 26, the slides 13 and 14 may not have relative longitudinal movement by which they might be misaligned or caused to bind against the cabinet or drawer. In other words, through the use of the telescoping bar 32, in conjunction with the supporting members 26, the slides are sufficiently rigidified to withstand excessive content loads or any other weight placed upon the drawer, and at the same time, allow sufficient lateral adjustability of the slides to prevent distortion and permanent misalignment thereof.

It is evident that the slides 13 and 14 may be adjustably connected not only at the forward but the rearward ends or, in the case of unusually long slides, intermediate the ends as well. Furthermore, it will be apparent that the specific structure of the bar 32 and mounting members 26 may be altered as needed to adapt these elements to various drawer and cabinet designs and, therefore, modifications or adaptations of this nature are contemplated insofar as they lie within the spirit and scope of the invention as defined in the hereunto annexed claims.

Having thus set forth my invention what I claim as new and for which I desire protection by Letters Patent is:

1. A suspension for a case or cabinet drawer comprising a pair of spaced apart slides, said slides being adapted to be engaged with suitable rails on said drawer, telescoping means arranged transversely of and connecting said slides, said means restricting said slides to lateral relative movement.

2. A suspension for a case or cabinet drawer comprising a pair of spaced apart slides adapted to engage suitable rails on said drawer, freely extensible means arranged transversely of and connecting said slides, said means being positioned out of the path of said drawer and restricting said slides to lateral relative movement.

3. A suspension for a case or cabinet drawer comprising a pair of spaced apart slides adapted to engage suitable rails on said drawer, members secured to and directed transversely of each of said slides, and means cooperating with said members to provide unrestricted lateral adjustment of said slides during installation and use.

4. A suspension for a case or cabinet drawer comprising a pair of spaced apart slides adapted to engage suitable rails on said drawer, members disposed transversely of and secured to said slides, a bar, the ends of said bar having telescoping engagement with said members, said members and said bar cooperating to provide unrestricted lateral adjustment of said slides during installation and use.

5. A suspension for a case or cabinet drawer comprising a pair of spaced apart slides adapted to engage suitable rails on said drawer, flat channel-like members arranged transversely of and secured to said slides, a bar having telescoping engagement with said channel-like members, and means on said bar adapted to prevent distortion thereof whereby said bar and said members may be relatively adjustable to facilitate varying the transverse spacing of said slides during installation and use.

6. A suspension for a case or cabinet drawer comprising a pair of spaced apart slides adapted to engage suitable rails on said drawer, channel-like members arranged transversely of and secured to said slides, a bar, the ends of said bar having telescoping engagement with said members, a rib extending longitudinally of said bar, said rib cooperating with the edges of said members to rigidify the connection between said slides and prevent longitudinal displacement thereof during installation and use.

WALTER R. HULTBERG.